United States Patent [19]

Furner

[11] 4,024,726

[45] May 24, 1977

[54] SOLAR HEAT TRAP FOR BUILDING WINDOWS

[75] Inventor: Ronald T. Furner, Birrong, Australia

[73] Assignee: Enercon West, Belmont, Calif.

[22] Filed: Apr. 11, 1975

[21] Appl. No.: 567,444

[52] U.S. Cl. .................................. 62/2; 52/171; 62/262

[51] Int. Cl.² ................. F25B 27/00; F25D 23/12; E06B 7/12

[58] Field of Search ............... 62/262, 2, 190, 201; 160/44; 52/171; 353/54; 165/48, 61, 107, 128

[56] References Cited

UNITED STATES PATENTS

| 2,496,466 | 2/1950 | Graham | 62/201 |
|---|---|---|---|
| 3,321,012 | 5/1967 | Hervey | 62/2 |
| 3,590,913 | 7/1971 | Tschudin | 52/171 |
| 3,695,681 | 10/1972 | Dockery | 52/171 |

*Primary Examiner*—Lloyd L. King
*Attorney, Agent, or Firm*—Townsend and Townsend

[57] ABSTRACT

A window construction to reduce temperature rises in building interiors caused by direct sunlight entering through the windows. The window comprises two parallel, spaced apart window panes with a space between them filled with a suitable heat exchange fluid such as water. A heat exchanger coupled to a refrigeration system cools the water while the water withdraws heat energy, i.e. infrared radiation from the sunlight. The refrigeration system is activated in response to direct sunlight entering through the window by either employing suitable light/heat sensors or by installing on the exterior building wall adjacent the window a heat absorbing plate which is exposed to the sunlight and which supplies the energy to drive an absorption refrigeration system coupled to the heat exchanger.

7 Claims, 4 Drawing Figures

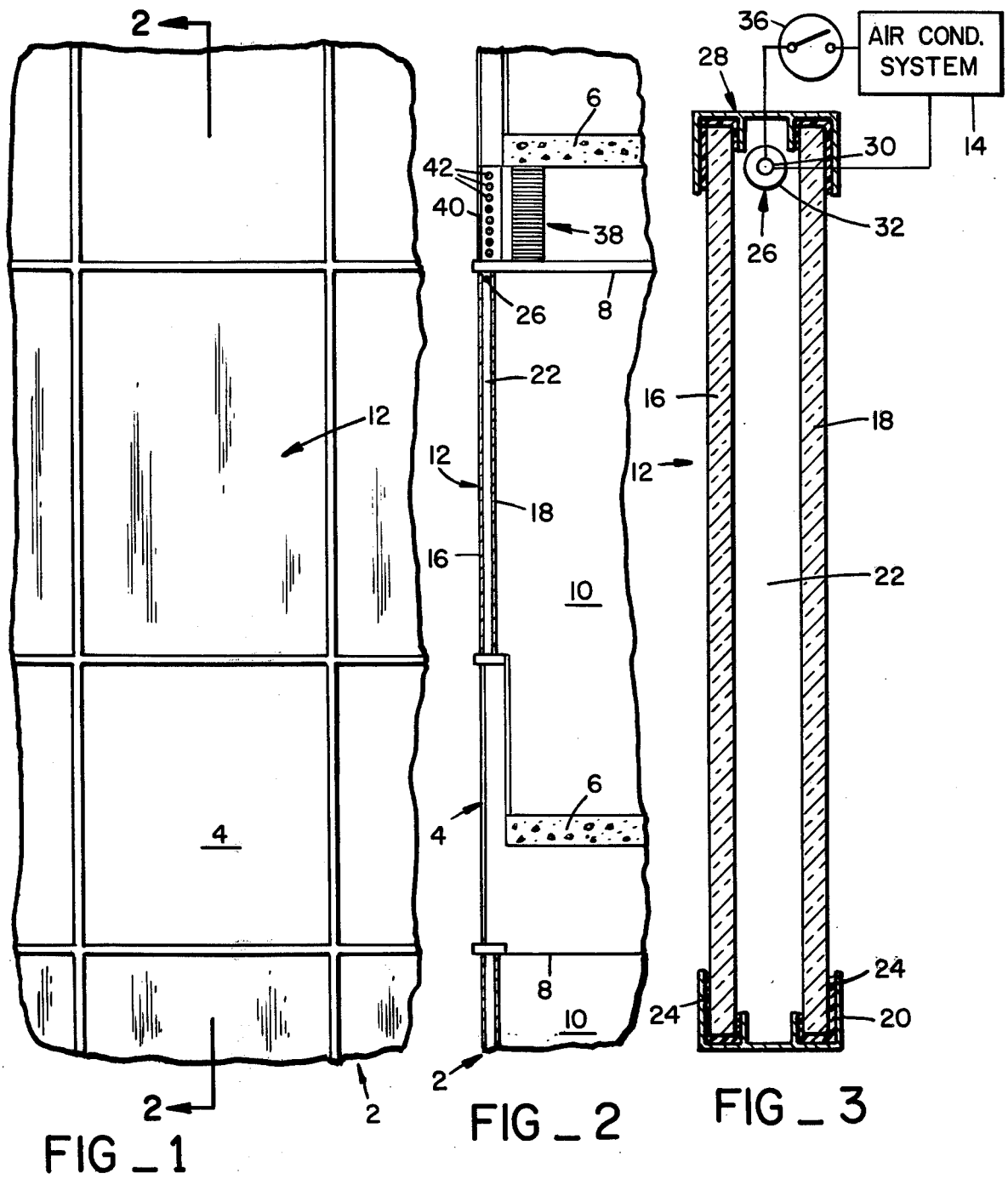
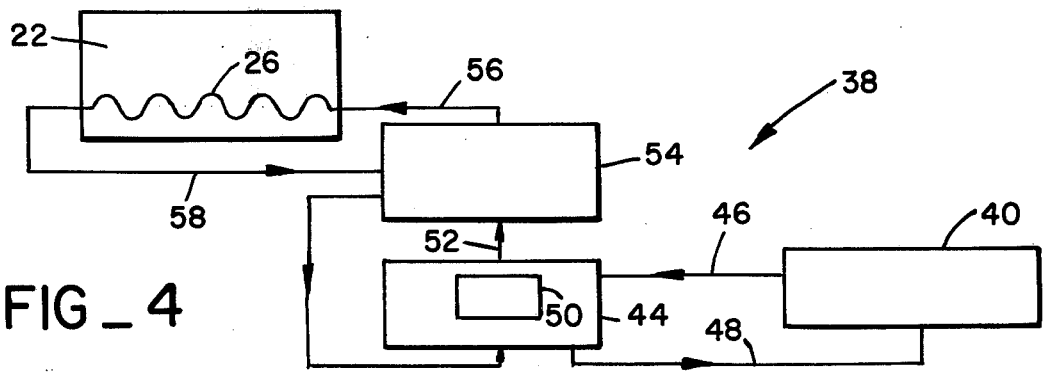

SOLAR HEAT TRAP FOR BUILDING WINDOWS

BACKGROUND OF THE INVENTION

In air conditioned buildings an attempt is made to maintain the interior temperature at the most comfortable level, e.g., at 22° C (72° F). The required cooling effort, that is, the amount of heat that must be withdrawn from the interior of the building is a function of both the outside temperature, any heat generated within the building (such as from machinery located therein), and heat radiated into the building by the sunlight (hereinafter sometimes referred to as "solar heat gain"). Depending on the building construction, and particularly the relative proportion between solid walls and glass walls or windows, between about 20–40% of the cooling effort is to offset the solar heat gain. Attempts have been made to reduce the solar heat gain as by employing heat absorbing glass, light reflecting glass, etc. However, these attempts are of limited effectiveness.

In modern office buildings it is generally assumed that one ton of air conditioning is required for every 250–350 square feet of floor area. For a moderate size building of 15 floors with a typical floor area of 10,000 square feet, between about 430–600 tons of air conditioning is required. If the solar heat gain could be eliminated or at least substantially reduced, so that the overall air conditioning load could be reduced by about 30%, for example, 150 tons of air conditioning could be deleted from such a building. At an average air conditioning plant cost of about $1,500 per ton initial plant savings would amount to approximately $225,000. More importantly, the reduction in the size of the air conditioning plant substantially reduces the energy requirements which result in correspondingly lower running costs and an energy conservation. With today's increasing difficulty in satisfying a modern society's energy requirement, coupled with the ever increasing demand for greater comfort, such an energy saving is truly significant. Moreover, the reduced air conditioning load which must be carried by the air conditioning system of the building permits the installation of smaller air conditioning ducts, which in turn saves building space by lowering the reuired floor height to thereby reduce the overall building costs.

SUMMARY OF THE INVENTION

The present invention provides a system which substantially reduces the solar heat gain of building interiors through building windows by absorbing from the sunlight heat or infrared radiation before such heat can reach the building interior. It thus enables a substantial cost reduction in the initial installation of building air conditioning systems and it further significantly reduces the running costs of the air conditioning system since less energy is required. As a most important result, the present invention significantly contributes to energy conservation.

Generally speaking, the present invention contemplates the provision of a double-pane window in which the two panes are spaced apart to define a window space therebetween. This space is filled with a heat-absorbing fluid, preferably clear water which is an ideal infrared radiation absorbing medium, so that part or all of the heat of the incoming sunlight will be absorbed by the fluid. The fluid is thereby correspondingly heated. A heat exchanger coupled to a refrigeration system is in contact with the fluid and cools it, that is, withdraws therefrom the heat energy absorbed from the sunlight. Consequently, the solar heat gain of building interiors is greatly reduced. The system further includes means for activating and deactivating the refrigeration system in response to the presence or absence, respectively, of sunlight entering the window so as to not unnecessarily cool the fluid at night or on cloudy days.

The coolant for the heat exchange supplied by the refrigeration system can be obtained from the central air conditioning unit for the building. In accordance with another aspect of the present invention, however, the coolant is obtained from a special absorption refrigeration system which is powered by sunlight, that is, by the heat energy obtained from sunlight. A heat absorption plate is installed adjacent, e.g., above the window in question on the building exterior so that it is exposed to sunlight whenever sunlight penetrates the window. The heat absorbed by the plate is then used to power the absorption refrigeration system and cool the fluid in the window space without consuming costly energy (as, for example, consumed by the central air conditioning unit for the building). This construction has the advantage that the refrigeration action is automatically discontinued when the exposure to sunlight of the window ceases. Furthermore, as the infrared radiation of the sun increases, that is, as the sunlight becomes hotter due to atmospheric conditions, the angle of the sun, etc., the cooling rate of the refrigeration system increases correspondingly because of the greater heat absorption by the absorption plate. Thus, the system is self-regulating.

Aside from the lower installation and operating costs for building air conditioning systems afforded by the present invention, the present invention permits the installation of small size air conditioning ducts in the ceiling/floor of the building so that the floor spacing can be reduced. This results in lower building costs and further enhances the economic advantages obtained by employing the present invention.

BRIEF DESCRIPTION OF THE DRAWINGS

FIG. 1 is a fragmentary, side elevational view of a building wall including a solar heat absorbing window constructed in accordance with the present invention;

FIG. 2 is a fragmentary, side elevational view in a section of the building wall shown in FIG. 1 that is taken along the line 2—2 of FIG. 1;

FIG. 3 is an enlarged side elevational view, similar to FIG. 2, of the window of the present invention; and FIG. 4 is a schematic flow diagram for a cooling system employed by the present invention.

DESCRIPTION OF THE PREFERRED EMBODIMENTS

Referring to the drawings, building 2 generally comprises an exterior, upright wall 4, a floor 6 and a ceiling 8 which terminate at the wall and which define interior or floor space 10. In the drawings the ceiling is illustrated as a suspended ceiling which depends from the next higher building floor. The building wall may be a glass, curtained wall and includes a plurality of windows 12 which permit daylight to enter into the interior building space. Those windows which are exposed to direct sunlight are heat absorbing windows constructed in accordance with the present invention so that part or all of the heat energy of the sunlight is removed therefrom before it reaches the interior building space. Accordingly, there is a lesser solar heat and temperature gain in the building and, if the building is air conditioned, less heat needs to be withdrawn from the building, thereby reducing both the capacity and the energy consumption of the central air conditioning system 14 for the building.

Window 12 comprises a pair of parallel, upright, spaced apart panes 16, 18 which are suitably mounted in a frame 20 to define a window space 22 between the panes. A gasket 24 or the like is placed between the panes and the frame to seal the window space from the building exterior and interior. The window space is filled with a heat absorbing fluid, that is, a fluid capable of absorbing infrared radiation from the incoming sunlight to prevent such radiation from reaching the building interior. In the presently preferred embodiment of the invention the fluid comprises clear, non-contaminated water. If desired, suitable coloring agents may be incorporated in the water to provide special effects or to filter or reduce the intensity of the sunlight.

A heat exchanger 26 is mounted adjacent an upper end 28 of the window and comprises a conduit 30 from which heat exchange fins 32 extend. The heat exchanger is coupled to the central air conditioning system 14 via suitable piping 34 so that a coolant flows through the heat exchanger to thereby continuously remove from the water in window space 22 heat energy absorbed by the water from the incoming sunlight.

In operation, the sunlight raises the water temperature in the window space and the warmer water rises to the top of the space where it contacts heat exchanger 26 and is cooled thereby. This causes the cooler water to flow downwardly until it is heated again to establish a continuous, water cooling circulation. The heat energy absorbed by the water is thus prevented from entering and heating the building interior 10. As a result, the air conditioning system for the building interior can employ ducts of smaller sizes whereby the spacing between adjacent floors 6 can be reduced, which in turn reduces the initial construction costs for the building. Furthermore, the sunlight which does enter the building is "cooled" and more comfortable to building occupants exposed to direct sunlight.

Since the present invention is primarily directed to filtering heat from sunlight entering the building through windows it is not desirable to cool the water in window space 22 if it is not subjected to direct sunlight. The present invention, therefore, provides a photo detector or heat sensor 36 which is mounted on the exterior of the building or in window space 22, for example, so that it can detect whether or not sunlight enters window 12. It disconnects the heat exchanger from the air conditioning system when no sunlight impinges on the window and it connects it to effect a cooling action when sunlight is directed at the window. The detailed construction of the photosensor and its interfacing with the air conditioning system is well known in the art and, therefore, is not further described herein.

To reduce the energy requirement for cooling the water in window space 22 a refrigeration system 38 is preferably provided which is independent of the building air conditioning system 14 and which employs solar energy as its energy source. The self-contained refrigeration system is preferably an absorption refrigeration unit. The construction of absorption refrigeration units is well known. See, for example, *Encyclopedia of Science and Technology*, Volume XI, McGraw-Hill, 1966, page 413, for a general description thereof.

For purposes of the present invention the absorption unit includes a spandrel glass or a metal solar absorption plate 40 which is mounted on the exterior of building wall 4, preferably immediately above window 12, and which forms part of the wall, e.g., the glass-curtain wall. The absorption plate absorbs solar energy, that is, heat energy, and heats a liquid passing through tubes 42 which, due to thermosyphon effects flows from the plate to the reservoir 44 via pipe 46. In the reservoir the liquid cools, gravitates towards the bottom as it cools and returns to the absorption plate through pipe 48. The heated liquid received in reservoir 44 is used to drive or power the absorption refrigeration system which, as such, is constructed in accordance with the prior art and which requires a heat source to operate.

In the environment of the present invention a boiler 50 is disposed within reservoir 44 and contains a refrigerant (such as freon) which is vaporized in the boiler. The refrigerant or coolant vapor passes from boiler 50 via pipe 52 to a refrigeration unit 54. The cool refrigerant is fed to heat exchanger 26 in window space 22 via pipe 56 and is returned to the unit as a warmed refrigerant via pipe 58.

In an alternate embodiment, the heat energy from absorption plate 40 may be used to charge an electric battery (not shown) as is known in the art. The stored charge of the battery is then used to heat boiler 7, thus deleting the interrelationship between reservoir 12 and boiler 7.

As is well know, the cooling rate of refrigeration system 38 is a function of the heat input, that is, of the heat absorption by absorption plate 40. The heat absorption in turn is a function of the rate with which sunlight radiates heat. Thus, stronger or hotter sunlight will cause a greater cooling rate of the refrigeration system. The hotter sunlight will cause a correspondingly greater heat absorption by the water in window space 22. With the greater cooling rate of the refrigeration system the additional heat absorbed by the water in the window space is absorbed and withdrawn. Thus, the system is self-regulating. Furthermore, when sunlight ceases, as at night or on cloudy days, the refrigeration system is automatically "turned off", that is, it becomes inoperative until again struck by direct sunlight.

Also provided, but not shown, are suitable louvers or the like in the exterior building wall for discharging heat developed within the refrigeration system.

I claim:
1. An air conditioned building comprising:
an exterior wall;
at least one floor and at least one ceiling vertically spaced from the floor to define a building interior;
the wall including at least one opening defining a window positioned to permit sunlight to enter the building interior;
first and second, horizontally spaced, sunlight transmission window panes in the wall opening and defining an upright window space between each other;
means sealing the window space from the building exterior and the building interior;
a heat absorbing liquid filling the window space, whereby sunlight passing through the building window is cooled before it enters the building interior and correspondingly heats the liquid;

a heat exchanger in the space in contact with the liquid;

an actuatable absorption refrigeration system operatively coupled to the heat exchanger for directing a coolant therethrough and for thereby directing the coolant in heat exchange relationship to the liquid; and means responsive to the presence or absence of sunlight and positioned to absorb heat energy from the sunlight entering the window for actuating or deactuating, respectively, the absorption refrigeration system.

2. A building according to claim 1 wherein the refrigeration system comprises an absorption refrigeration system, and including means positioned to absorb heat energy from the sunlight for activating the absorption refrigeration system.

3. A building according to claim 1 wherein the sunlight heat absorbing means comprises a section of the exterior building wall.

4. A building according to claim 3 wherein the opening spans a portion of the vertical spacing between the building floor and the building ceiling, and wherein the absorption plate comprises a section of the exterior building wall which is vertically spaced from the opening.

5. A building according to claim 4 wherein the refrigeration system is mounted in substantial alignment with the absorption plate and vertically spaced from the window opening so as to not obstruct the clear view through the opening.

6. A building according to claim 1 wherein the heat exchanger is disposed in the window space.

7. A building according to claim 1 wherein the liquid comprises of water.

* * * * *